(12) United States Patent
Stager et al.

(10) Patent No.: US 9,877,251 B2
(45) Date of Patent: Jan. 23, 2018

(54) ROAMING TECHNIQUES FOR HIGH SPEED CLIENT DEVICE

(71) Applicant: Cisco Technology, Inc., San Jose, CA (US)

(72) Inventors: Paul J. Stager, Akron, OH (US); Tak Ming Pang, Palo Alto, CA (US); Evgeny Yankevich, Beachwood, OH (US); Arnab Sengupta, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 700 days.

(21) Appl. No.: 14/449,763

(22) Filed: Aug. 1, 2014

(65) Prior Publication Data

US 2015/0264614 A1    Sep. 17, 2015

Related U.S. Application Data

(60) Provisional application No. 61/950,909, filed on Mar. 11, 2014.

(51) Int. Cl.
*H04W 36/18* (2009.01)
*H04W 36/32* (2009.01)
(Continued)

(52) U.S. Cl.
CPC ....... *H04W 36/18* (2013.01); *H04W 36/0061* (2013.01); *H04W 36/30* (2013.01);
(Continued)

(58) Field of Classification Search
CPC . H04W 36/18; H04W 36/0061; H04W 36/30; H04W 36/32; H04W 36/0083;
(Continued)

(56) References Cited

U.S. PATENT DOCUMENTS 8,000,298 B2    8/2011   Tsutsumi et al.
8,089,939 B1 *  1/2012   Mater ............... H04W 36/30
                                                      370/332

(Continued)

FOREIGN PATENT DOCUMENTS

EP          1601136 A1    11/2005

OTHER PUBLICATIONS

International Search Report and Written Opinion in counterpart International Application No. PCT/US2015/019628, dated Aug. 4, 2015, 18 pages.

(Continued)

*Primary Examiner* — Andrew Chriss
*Assistant Examiner* — Ellen Kirillova
(74) *Attorney, Agent, or Firm* — Edell, Shapiro & Finnan, LLC

(57) ABSTRACT

Access points and a wireless client device, such as a workgroup bridge, are configured to optimize a roaming algorithm of the client device for a high-speed vehicle scenario, such as a high-speed train. A static/dynamic neighbor list is generated and used to improve scanning efficiency. An improved parent access point selection procedure, metrics, and thresholds are provided to optimize client roaming along the vehicle's path, e.g., the train track.

22 Claims, 6 Drawing Sheets

(51) Int. Cl.
H04W 36/00 (2009.01)
H04W 36/30 (2009.01)
H04W 84/00 (2009.01)
H04W 48/16 (2009.01)

(52) U.S. Cl.
CPC ......... H04W 36/32 (2013.01); H04W 84/005 (2013.01); H04W 36/0083 (2013.01); H04W 36/0088 (2013.01); H04W 48/16 (2013.01)

(58) Field of Classification Search
CPC H04W 36/0088; H04W 84/005; H04W 48/16
USPC .......................................................... 370/322
See application file for complete search history.

(56) References Cited

U.S. PATENT DOCUMENTS

| | | | | |
|---|---|---|---|---|
| 9,253,674 | B2* | 2/2016 | Rosener | H04W 24/10 |
| 2003/0163579 | A1* | 8/2003 | Knauerhase | H04W 16/06 |
| | | | | 709/230 |
| 2003/0203735 | A1* | 10/2003 | Andrus | H04W 36/30 |
| | | | | 455/450 |
| 2006/0268756 | A1* | 11/2006 | Wang | H04W 36/32 |
| | | | | 370/310 |
| 2006/0280131 | A1* | 12/2006 | Rahman | H04L 45/02 |
| | | | | 370/256 |
| 2007/0104148 | A1 | 5/2007 | Kang et al. | |
| 2008/0152034 | A1* | 6/2008 | Liu | H04W 48/16 |
| | | | | 375/295 |
| 2008/0186917 | A1 | 8/2008 | Wu et al. | |
| 2009/0252127 | A1* | 10/2009 | Rangarajan | H04W 16/10 |
| | | | | 370/338 |
| 2011/0205910 | A1* | 8/2011 | Soomro | H04W 80/04 |
| | | | | 370/252 |
| 2013/0148641 | A1 | 6/2013 | Sivaprakasam et al. | |
| 2013/0188628 | A1* | 7/2013 | Lee | H04W 48/14 |
| | | | | 370/338 |
| 2014/0105195 | A1 | 4/2014 | Balasubarmaniyan et al. | |
| 2014/0171108 | A1* | 6/2014 | Waters | H04W 4/02 |
| | | | | 455/456.1 |
| 2015/0257120 | A1* | 9/2015 | Prechner | H04W 64/003 |
| | | | | 455/456.1 |

OTHER PUBLICATIONS

Partial International Search Report in counterpart International Application No. PCT/US2015/019628, dated May 27, 2015, 7 pages.

* cited by examiner

ROAMING TECHNIQUES FOR HIGH SPEED CLIENT DEVICE

CROSS REFERENCE TO RELATED APPLICATION

This application claims priority to U.S. Provisional Application No. 61/950,909 filed Mar. 11, 2014, the entirety of which is incorporated herein by reference.

TECHNICAL FIELD

The present disclosure relates to wireless networks.

BACKGROUND

Currently, trains moving at high speeds deploy Long Term Evolution (LTE) as the wireless communication technology for the backhaul for wireless network communications for passengers on trains.

A new solution is to deploy Wi-Fi™ as a carrier instead of LTE in this high speed environment. A workgroup bridge (WGB) operating as a client on the train is used to bridge wireless network communications on behalf of clients on the train and access points positioned trackside along the path of travel of the train. The WGB (as a client) roams between the trackside APs to deliver seamless handoff.

DESCRIPTION OF EXAMPLE EMBODIMENTS

Overview

According to the example embodiments presented herein, access points (APs) or a wireless network controller interact with a mobile wireless client device (WCD) (e.g., a workgroup bridge (WGB)) to optimize a roaming algorithm for the client device in a high-speed vehicle scenario, such as when the client device is deployed on a high-speed train. A static/dynamic neighbor list is generated and used to improve scanning efficiency of the client device. An improved parent access point (AP) selection procedure, metrics, and thresholds are provided to optimize client roaming along a vehicle path, e.g., a train track.

In one embodiment, the WCD (e.g., a WGB) is configured to connect with the APs over wireless channels of the APs and route traffic between multiple devices served by the WCD and the connected APs. The WCD receives a neighbor list from an AP to which the WCD is currently connected over a wireless channel. The neighbor list identifies neighbor APs and wireless operating channels thereof in a vicinity of the AP. If a link quality of the wireless connection falls below a roam threshold, the WCD attempts to roam to a neighbor AP on the neighbor list. To attempt the roam, the WCD performs active scans of the wireless operating channels in the neighbor list, determines a best neighbor AP on the neighbor list to which to roam based on results of the active scans, and if a best neighbor AP is determined, roams to the best neighbor AP.

In another embodiment, an AP operates in a network of APs. Each of the APs is configured to connect with a WCD (e.g., a WGB) over wireless channels. The WCD is configured to serve client devices and route traffic between the client devices and the network over the wireless channels. The AP scans wireless channels for receipt of neighbor discovery packets broadcasted by neighbor APs in a vicinity of the AP. The AP populates a neighbor list with identities of neighbor APs and corresponding scanned channels served thereby from which the neighbor discovery packets were received. The AP also broadcasts neighbor discovery packets for receipt by the neighbor APs. The AP wirelessly connects to the WCD, and receives a request for the neighbor list from the WCD. In response to the received request, the AP transmits the neighbor list to the WCD.

Example Embodiments

Figure 1:
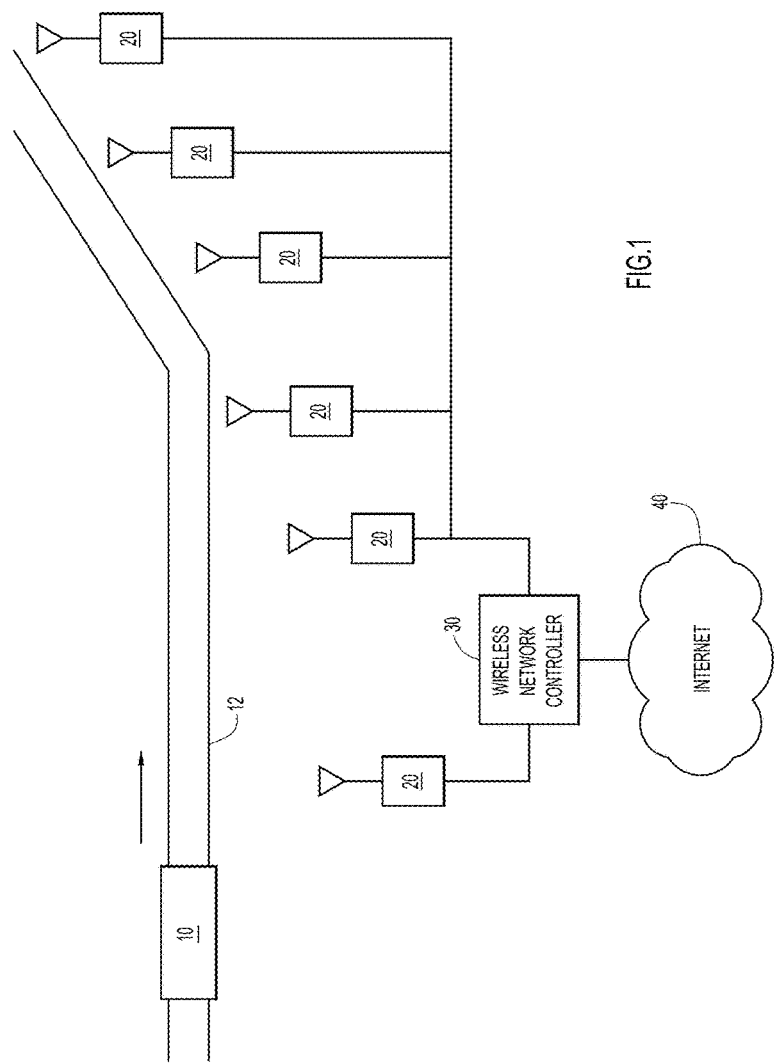
FIG. 1 is a system block diagram of a high-speed vehicle environment in which a wireless client (such as a workgroup bridge), access points, and/or a wireless network controller may be configured to facilitate improved neighbor list generation and access point selection according to the example embodiments presented herein.
Figure 2:
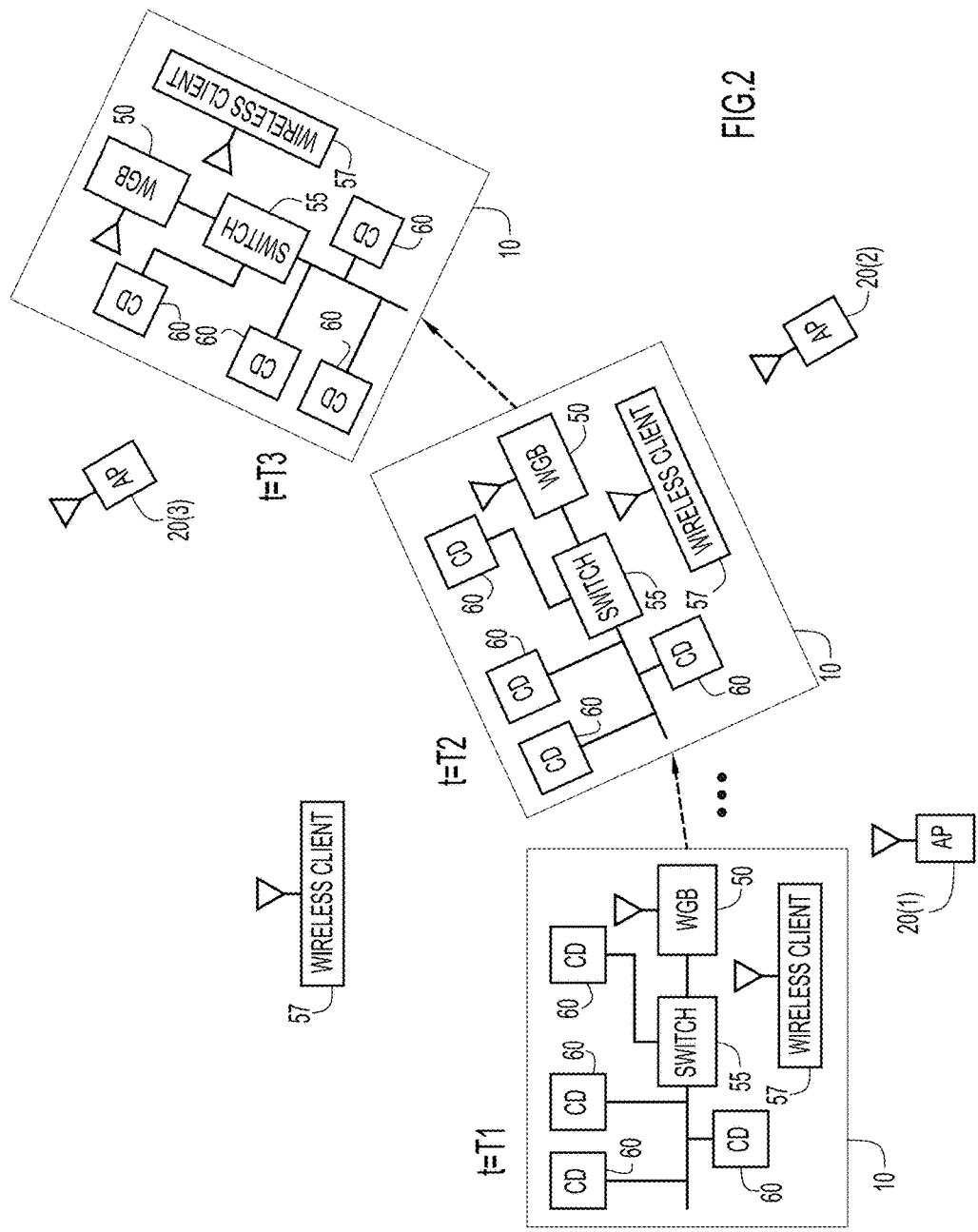
FIG. 2 is a more detailed system block diagram according to the example embodiments presented herein.

Reference is made first to FIGS. 1 and 2 for a high-level description of an embodiment, after which a detailed description will be presented. FIG. 1 shows a fast moving vehicle, such as a high speed train car 10 moving along a track 12. It is desirable to provide network connectivity to users/devices on the train. To this end, trackside wireless local area network access points (APs) 20 are deployed along the path of the track 12. Each of the APs 20 is coupled to a wireless network controller 30, which in turn, is connected to the Internet 40. Alternatively, each AP may have direct connectivity to the Internet or connectivity through a gateway device not shown in the figures. APs 20 may each be referred to singularly as "AP 20." The trackside APs 20 may operate on any of a number of regulatory domain wireless channels or frequencies, including Dynamic Frequency Selection (DFS) frequencies, in the 5 GHz frequency band. The APs 20 are deployed on the side of the track at regular separation distances from each other and the track. The operations described herein of the wireless network controller 30 may be deployed (co-located) in an AP. That is, any type of controller, including one in each AP or distributed among APs, may be used.

As shown in FIG. 2, there is at least one workgroup bridge (WGB) 50 on the train car 10 (i.e., the WGB is a mobile WGB). The WGB 50 operates as a mobile wireless client device with respect to the trackside APs 20, and connects to a switch 55 to serve clients (CDs) 60 inside the train car 10. FIG. 2 shows that the train car 10 is at one location proximate to AP 20(1) at time t=T1, at another location proximate to AP 20(2) at time t=T2, and at still another location proximate to AP 20(3) at time t=T3. Thus, when the WGB is associated to (i.e., connected with) AP 20(1), it may receive a list of neighbor APs of AP 20(1), and that list may include APs 20(2) and 20(3), as well as other information as described further below. The list of neighbor APs is referred to as a "neighbor list."

While moving in a specific direction between two trackside APs, the roaming latency should be below 100 milliseconds (ms), for example, in order to deliver a minimum sustained throughput rate of at least 15 Mega-bits-per-second (Mbps) supporting voice, video and data traffic with minimal packet latency and jitter, with an application packet error rate less than one percent (1%) between the clients behind the WGBs in the train cars.

The wireless network controller 30 stores data indicating, for each AP, the list of neighbor APs, including an indication of relative distance to each neighbor AP, and distributes that information to each AP in the deployment, which in turn store the information. The wireless network controller 30 may also store data for the spatial x-y-z locations (x-y-z coordinates) of the APs along the path of travel (along the track) of the train. Therefore, the wireless network controller 30 and each of the APs have information that can notify a WGB of the AP that it should be associating to next based on (i) the AP the WGB is currently associated to, and (ii) the path of travel of the AP (which can only be in one of two opposite directions along the track).

Initially, the WGB 50 wirelessly connects to (and thus associates with) an AP. The AP to which the WGB 50 is currently connected is referred to as a current parent AP or simply a "parent AP." After that, WGB 50 requests from the parent AP a list of APs that are neighbors of the parent AP, the spatial location information available for those neighbor APs, and channels on which the neighbor APs are operating. The parent AP will respond to the request with the information to enable the WGB 50 to know to which AP it should focus as a roaming target.

In addition, wireless network controller 30 has current/up-to-date information about the channels on which all of the APs in the wireless network are operating, as well as whether an AP on a DFS channel measured/detected a radar event. Since Wi-Fi™ networks share the frequency band with radar systems, if an AP detects a radar device operating on a channel in the frequency band, the AP needs to vacate that channel and switch to another channel. In the case the radar event is detected, the controller updates the frequency channel associated with this AP to indicate that the DFS channel on which the radar event was detected and the new DFS channel to which the AP has switched and on which the AP now operates. In another embodiment, each AP performs the tracking of corresponding DFS information (e.g., which DFS channels the AP is using, on which DFS channels the AP has detected radar events, and to which channels the AP has switched as a result of the detected radar event).

When roaming between APs that can operate on DFS channels (which must defer operation to radar devices), according to regulatory requirements, a client (in this case, the WGB 50) performs a passive scan of that channel (i.e., performs a receiver dwell on the channel in a listen-only mode) to detect whether there is an AP operating on that channel. The client does not actively scan the channel (i.e., transmit a probe request on the channel) because it may interfere with a radar device, which has priority use of the channel. The passive scan process is slow. Therefore, when the passive scan of the AP channels is employed by a fast moving client (e.g., WGB 50 on a train), by the time the WGB 50 detects an AP on a channel (via the passive scans), the WGB may have moved out of range of the AP that it detected.

By sending to a WGB 50 a list of neighbor APs of an AP to which the WGB is currently connected, and other information such as the channels the neighbor APs are operating on and whether any such channels are DFS channels (and whether a radar event has been detected on a DFS channel), the WGB 50 has more detailed information to enable it to know whether it can perform an active scan (i.e., send probe requests) on a particular channel served by one of the neighbor APs and remain compliant with any regulator requirements, i.e., with respect to radar devices that could be operating on a DFS channel. This enables the WGB 50 to reduce its roaming time to an appropriate neighbor AP.

It is to be understood that the techniques presented herein to enable the WBG 50 to roam between APs in a high-speed situation on a specific planned route are applicable to any wireless client device as well. To this end, a wireless client device 57 is shown in FIG. 2. Any wireless client device or device configured to operate as a wireless client device may be configured to employ the improved neighbor list techniques presented herein. The reference to the WGB 50 is only meant to be an example, and not to be limiting.

Presented herein are techniques that exploit the concepts described above. These techniques are generic in that they do not make any assumptions about the channel assignment or transmit power or antenna patterns etc. of the APs. These techniques provide a way to quickly detect that the current AP (that is, the AP to which a client is currently associated) is becoming suboptimal and it is time to switch to a new AP. Furthermore, these techniques enable the WGB 50, once it has determined it is time to switch to a new AP, to identify the next AP to associate to.

The following Sections (1)-(6) provide further details of these techniques.

1. List of Channels of Neighboring APs from 802.11v BSS Transition

IEEE 802.11v includes a feature called Basic Service Set (BSS) Transition that allows an 802.11 station (STA) to request a neighbor list from its associated AP. The neighbors of a parent AP are the APs which the parent AP can hear during its off-channel scans. Some APs periodically go off-channel (i.e., tune to channel(s) not currently being used for service) and send Neighbor Discovery Packets (NDP) on the off-channel. Neighbor APs receiving NDPs from the current parent AP are in the neighbor list. The neighbor list is sent from the AP to a requesting client (e.g., WGB 50) through a BSS Transition Response frame. The neighbor list can be created/built based on parent AP off-channel transmissions to neighboring APs as well as neighbor APs off-channel transmissions to the parent AP. The neighbor list created based on the receipt of NDPs from neighbor APs is referred to as an "automatic dynamic neighbor list."

According to the techniques presented herein, the neighbor list is optimized to include only immediate neighbor APs based on receive signal strength information (RSSI) and location metrics. Immediately after the WGB 50 associates with a parent AP, it sends a BSS Transition Query frame to the parent AP, and the parent AP then responds with its current neighbor list. A similar neighbor list can be sent to the WGB 50 in an IEEE 802.11k neighbor list frame or using a non-standard mechanism. The neighbor list can also be sent to the WGB 50 without the need for a request. The neighbor list includes the following information per neighbor AP:

a. Basic Service Set Identifier (BSSID) of the neighbor.
b. Regulatory class; Channel number(s) on which the neighbor AP is operating (i.e., its serving channel).
c. PHY layer type; Service Set Identifier (SSID).

d. Neighbor AP location information.

e. List of vacated DFS channels on which the neighbor AP and neighbors of the neighbor AP have detected radar events.

The neighbor list therefore allows the WGB 50 to quickly identify the small set of channels on which it needs to scan (using active scans instead of passive scans) to find the next parent AP. The neighbor list is processed to limit this set of channels to only 2-3 entries considering the potential parent APs are approximately 300 m apart in some deployments and may use directional antennas.

As an alternative to the automatic dynamic neighbor list, a capability is provided to choose/select neighbor APs and construct a static roaming neighbor list per AP based on known/predetermined AP locations. The known neighbor APs are configured into the static neighbor list of an AP. The static entries can be programmed solely into the neighbor list response to the client or combined with dynamic entries (of the dynamic neighbor list). This covers deployment scenarios in which neighboring APs cannot hear each other and therefore cannot dynamically detect each other through neighbor discovery even though they are in fact neighbors. Consider, for example, a sharp bend in the tracks along which the WGB 50 travels and that APs have directional antennas pointed along the track, or deployments in which the track runs along a wall, cliff, etc.

2. Active Scanning on DFS Channel

From the neighbor list, the WGB 50 knows what channels the neighbor APs (and therefore candidate parent APs) are operating on (i.e., serving). Armed with this knowledge, during a roam from a current parent AP to a new parent AP, the WGB 50 is able to skip passive scans and go directly to active scans on the channels listed in the neighbor list in search of the new parent AP, even when one of the APs is on a DFS channel. That is, the WGB 50 will actively scan a DFS channel for a new parent AP if the AP (and its operating channel) is present in the neighbor list. This reduces the discovery time of a new parent AP from 100-200 ms to about 5-10 ms, for example.

The following techniques ensure WGB active scanning complies with DFS channel Federal Communications Commission (FCC) rules:

a. APs can notify neighbor APs thereof over-the-air of a detected DFS radar event using wireless messaging. If radar is detected on a DFS channel, the AP vacates the occupied DFS channel, switches to a new DFS channel (or non-DFS channel), and sends messages to the neighbor APs on the neighbors' channels notifying the neighbor APs of the DFS channel on which the radar event was detected and the switch to a new, unoccupied channel (which may an unoccupied DFS channel). In turn, the neighbor APs then update their respective neighbor lists to reflect the DFS information and notify their clients (e.g., WGB 50) of the new channel through the updated neighbor lists. In turn, the WGB updates its neighbor lists (which serve as roaming tables) accordingly. That way, the WGB 50 is provided with current DFS channel information before accessing the next AP serving channel. In another embodiment, APs can notify the WGB 50 of the DFS information in the form of an Inter-Access Point Protocol (IAPP) Level-2 (L2) broadcast within the subnet or Internet Protocol (IP) unicast messaging outside subnet, instead of via an updated neighbor list.

b. APs can increase the frequency (i.e., repetition rate) of beacon frames or broadcast probe responses while the AP is not serving any train traffic, i.e., not connected to WGB 50. When the AP is serving WGB 50, i.e., is a parent AP, the AP decreases the frequency/repetition rate. The radios of APs along the track are mostly idle before the arrival of a next train. An increase in the frequency of the beacon frames or broadcast probe responses generally does not impact AP performance. This allows WGB 50 to hear a beacon frame/probe response (enable signals) immediately after the WGB 50 tunes to the channel of the next AP before active scanning the channel.

c. Neighboring APs may be connected through wire. The neighboring APs can communicate to each other over the wire when/if they leave the current serving channel due to a DFS detection. Thus, APs may notify neighbor APs via wired messaging to convey the same information as described above in technique (a).

d. The WGB 50 may use a second radio (2.4 GHz/5.8 GHz bands) to detect beacon and active scanning for the next AP. The next AP will include its DFS radio channel status in the 2.4 GHz/5.8 GHz band beacon/probe response. The WGB 50 can active scan in the 2.4 GHz/5.8 GHz band first before it knows if it is appropriate to active scan in the 5 GHz DFS channel of the next AP.

At WGB 50, the combination of performing active scans of only DFS and non-DFS channels in the neighbor list and not performing (i.e., skipping) active scans altogether, reduces the discovery time of a parent AP by the WGB from 100-200 ms to about 5-10 ms, for example.

Figure 3:
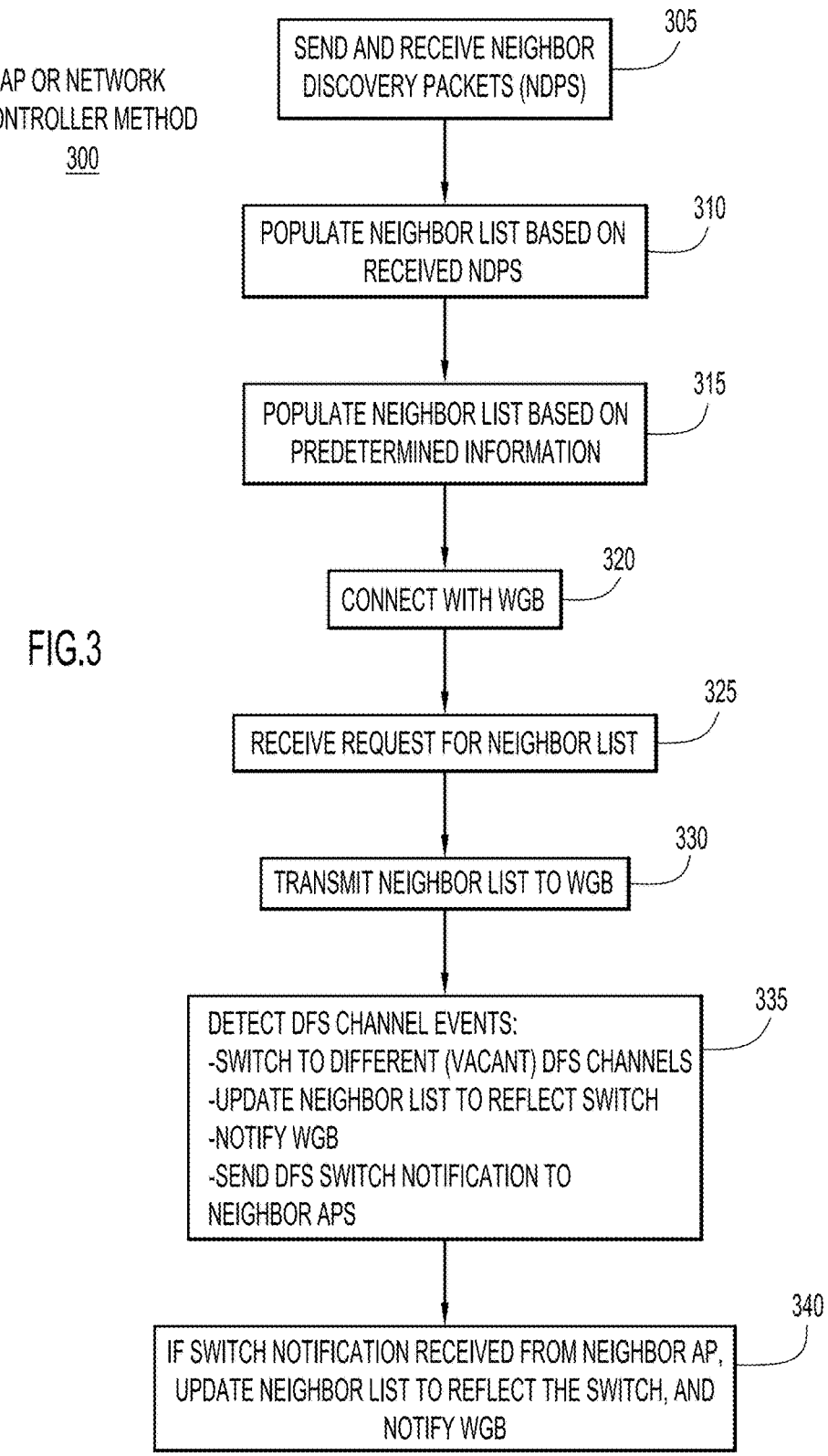
FIG. 3 is a flow chart depicting operations performed by an access point or a wireless network controller according to the example embodiments presented herein.

With reference to FIG. 3, there is a flow chart of a method 300 of creating and transmitting neighbor lists performed by each AP 20. In other embodiments, the operations of method 300 may be performed by wireless controller 30, or may be distributed between APs 20 and controller 30. Method 300 summarizes detailed operations described above.

At 305, the AP sends and receives neighbor discovery packets (NDPs) on off-channels scanned by the AP. The sent neighbor discovery packets include the AP's current serving channel information.

At 310, the AP populates a neighbor list with identities of the neighbor APs and their associated channels from which the NDPs were received (i.e., dynamic entries).

At 315, the AP may populate the neighbor list with identities of predetermined APs and associated channels (i.e., static entries).

At 320, the AP wirelessly connects with (and associates to) a WGB 50.

At 325, the AP receives a request for the neighbor list from the WGB 50.

At 330, the AP transmits the neighbor list to the WGB 50.

At 335-350, the AP performs DFS channel processing.

At 335, the AP detects whether a DFS event has occurred on a DFS channel served by the AP. If an event is detected, the AP:

a. vacates that channel and switches to a DFS channel (or non-DFS channel) on which no event have been detected.

b. updates the neighbor list to reflect the switch.

c. notifies the WGB 50 of the switch to the new channel and the identity of the occupied DFS channel.

d. notifies neighbor APs of the switch (e.g., transmits a DFS switch notification) and the identity of the occupied DFS channel.

At 340, if the AP receives a DFS switch notification from a neighbor AP, the AP updates the neighbor list and notifies the WGB 50 of the update.

3. WGB Parameters

The following parameters are employed by the WGB 50 so that it can quickly detect that the current parent AP (to which the WGB is currently connected) is a suboptimal parent AP and that, therefore, a roam by the WGB to a new parent AP needs to be initiated:

a. Channel sampling Period (T): The WGB 50 repeatedly determines a link quality of a wireless link (i.e., the wireless channel) between the WGB and its current parent AP. The channel sampling period T (or, inverse, the channel sampling frequency) controls a time interval between successive evaluations/determinations of the link quality. This parameter may be dynamically varied depending on a speed of the WGB 50 (e.g., on a train). For example, if the speed of the WGB 50 is relatively fast, the WGB may evaluate the link quality more frequently; however, if the WGB speed is relatively slow, the WGB may evaluate the link quality less frequently.

b. Moving average filter length (N): This is the number of data packets from the parent AP that the WGB 50 uses to keep track of (i.e., determine) the link quality of the link between the WGB 50 and the parent AP. A running average is maintained of the RSSI of the last N received data packets from the parent AP. If this running average falls below a configurable threshold, the WGB 50 initiates a roam. This parameter may also be a function of the WGB speed (e.g., train speed). For high speed situations, a smaller number of samples may be used in order to reduce an error range of RSSI measurements caused by a logarithmic relationship between distance and RSSI level.

4. AP Selection Logic

Once the WGB 50 decides to initiate a roam, it performs active scanning on each of the channels in its neighbor list and maintains the following additional information per neighbor AP in a local NeighborTable database stored in the WGB:

a. Current RSSI: This is RSSI of the most recently received Probe Response from the neighbor AP.

b. Last RSSI: This is the RSSI of the last but one most recently received Probe Response from the neighbor AP.

c. Delta RSSI: This is the difference between the current and the last RSSI.

d. Average RSSI: This is a running average of all the RSSI values received from this neighbor.

Given a list of candidate APs, the WGB 50 first disregards any that are associated with a negative Delta RSSI. This prevents a roam to an AP whose link quality is degrading over time. Then, among the neighbor APs associated with positive Delta RSSIs, the WGB 50 selects the best AP, based on a combined RSSI and location weight function, as the next parent AP and proceeds to associate/connect with it. For example, the best AP may be the neighbor AP associated with a greatest average RSSI and a positive Delta RSSI.

There is also a valid counter associated with each entry in the NeighborTable. The purpose of this counter is to purge any neighbor APs that are no longer reachable from the WGB 50. The valid counter is defaulted to begin as 2. Each time the WGB 50 receives a neighbor list from the parent AP, the NeighborTable is traversed and the counter is decremented by one. When the counter reaches 0, the entry is removed from the NeighborTable. If an entry in the NeighborTable is also found in the neighbor list, the valid counter is refreshed to 2. The value 2 is chosen since it is expected that any root AP will become unreachable after 2-3 roams from it.

5. Scan Only Immediate Neighbors

In an embodiment, the WGB 50 will scan only the "immediate" neighbor APs reported by the current AP determined based on a direction or heading of the WGB relative to the APs in the neighbor list, i.e., not all of the neighbor APs in the neighbor list, to further optimize the scanning time. In other words, WGB generates an immediate neighbor list from the neighbor list, where the immediate neighbor list is smaller than the neighbor list. During a roam, the WGB only scans the channels on the smaller immediate neighbor list. The immediate neighbor list is generated based on a heading of the WGB relative to the locations of the APs on the neighbor list. Consider the following example scenario:

a. AP1 only sees AP2.
b. AP2 sees only AP1 and AP3.
c. AP3 sees AP2 and AP4.
d. AP5 sees AP6 and AP4, and so on.

At a certain instance when the WGB 50 roams from AP2 and gets connected to AP3 while moving in a direction from AP2 to AP4, the WGB gets a neighbor list in the BSS Trans Request Frame from AP3 with AP2 and AP4 as its neighbor and adds it to the list. So now the WGB 50 already has AP1, AP2, AP3 as well as AP4 in its local neighbor list. Therefore, it will scan and probe all the 4 servicing channels for AP1 to AP4 even though it does not need to scan and probe AP1 when the WGB 50 is moving from left to right from AP3 to AP4.

The WGB 50 roams and connects to AP3 while moving in a direction from AP2 to AP4. The WGB 50 receives a neighbor list in the BSS Trans Request Frame from AP3 with AP2 and AP4 in the neighbor list. According to the immediate neighbor embodiment, the WGB 50 only actively scans channels associated with the current AP (AP3) and then the channels on an immediate neighbor list that contains only AP2 and AP4.

6. Fallback-Full Scanning

The WGB 50 includes a fallback mechanism under which the WGB will fallback to full scanning under certain situations. Full scanning includes both passive and active scans on a full set of regulatory domain channels and does not rely on the neighbor list. Full scanning is described in further detail below in connection with operations 475 and 480 of FIG. 4. The WGB 50 resorts to full scanning under the following conditions:

a. When the WGB 50 receives a NULL neighbor list from the current parent AP, the WGB will destroy its current neighbor list and trigger full scanning b. When the RSSI of the communication link between the WGB 50 and the current parent AP is greater than the roam threshold, and the WGB did not received the neighbor list from the current parent AP, the WGB will request the neighbor list a second time. If the WGB 50 receives the neighbor list responsive to this retry, the WGB will scan the neighbor list in a next roam; otherwise, the WGB will trigger full scanning.

c. When the RSSIs of all potential APs falls below a "full scanning threshold," then full scanning is used as a failsafe. The full scanning threshold is an RSSI below which practically the APs are not usable. The full scanning threshold is configurable and is less than the roam threshold. In examples, the roam threshold can be −65 dBm (or −70 dBm); however links are still sustainable down to −77 to −80 dBm in a fading channel. The criteria for initiating a full scan are separate from the criteria for roaming.

Figure 4:
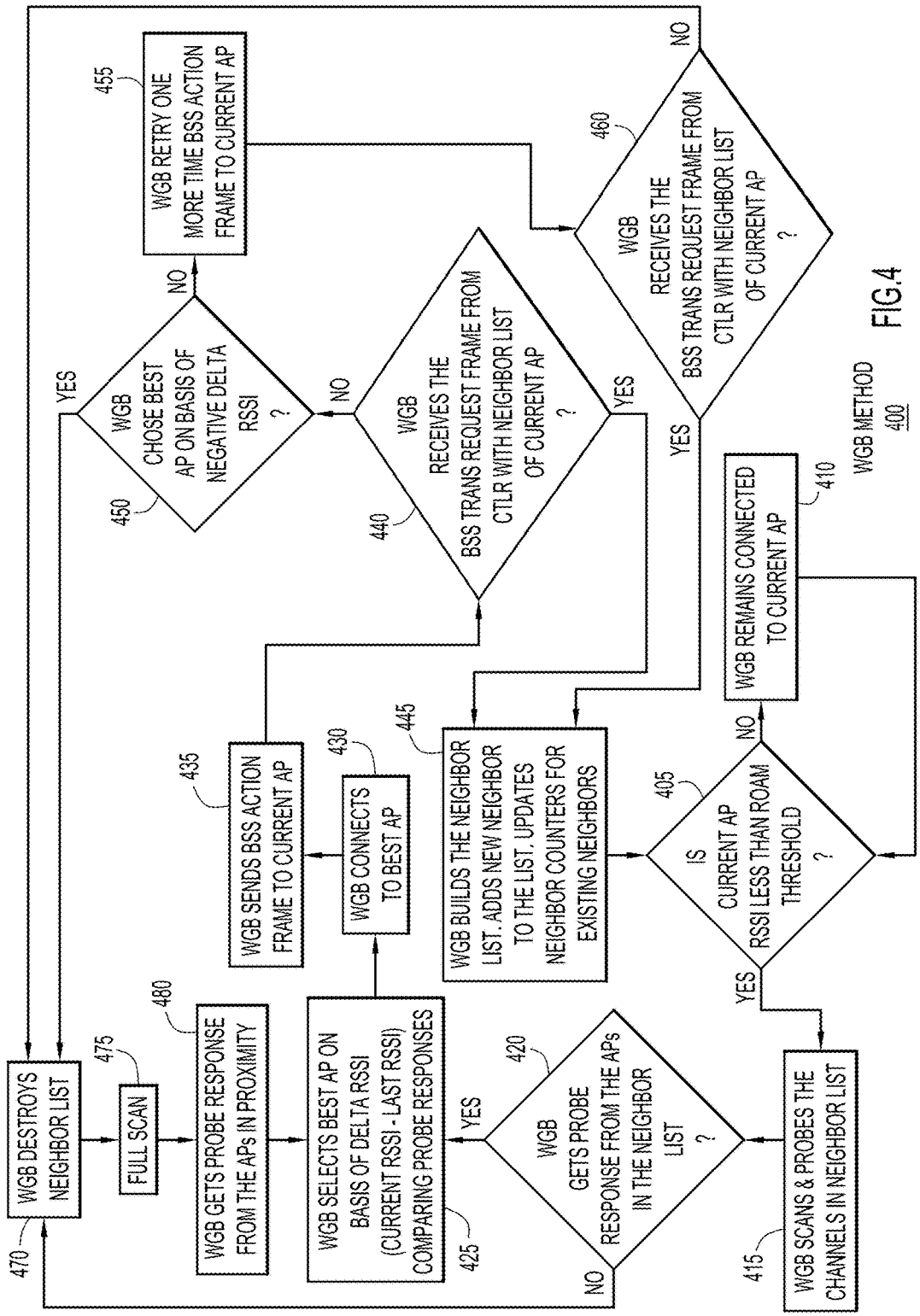
FIG. 4 is a flow chart depicting operations performed by a wireless client (such as a wireless workgroup bridge) according to the example embodiments presented herein.

FIG. 4 is a flow chart of a method 400 of operating mobile WGB 50, or any similarly configured wireless client device (e.g., wireless client device 57), using a neighbor list. Method 400 summarizes the detailed WGB operations described above.

At 405, the WGB 50 is currently connected to a current parent AP (referred to as "current AP" in FIG. 4 and in the ensuing description) over a wireless channel and has received a neighbor list (as described above) from the current AP. The WGB 50 (repetitively) determines a link quality of the wireless channel at a repetition rate.

In one embodiment, the WGB 50 also determines a speed at which the WGB is travelling. The WGB 50 may determine the speed based on location information received from any number of sources, including, but not limited to, a Global Navigation System (GPS). The WGB 50 increases and decreases the repetition rate in correspondence with increases and decreases in the determined WGB speeds, respectively.

In another embodiment, the WGB 50 determines the link quality as an average RSSI for the wireless channel based on a number N of packets received from the current AP over the wireless channel. The WGB 50 increases and decreases the number N of received packets used to determine the average RSSI in correspondence with increases and decreases in the determined WGB speeds, respectively.

At 410, if the determined link quality remains above the roam threshold, the WGB 50 remains connected to the current AP.

At 415, if the determined link quality falls below the roam threshold, the WGB 50 initiates a roam procedure and attempts to roam first to a neighbor AP on the neighbor list, i.e., the WGB searches the neighbor list for a new parent AP. To do this, the WGB 50 performs active scans (without performing passive scans) only on the channels identified in the neighbor list.

In an "immediate neighbor" embodiment, the WGB 50 generates an immediate neighbor list from the neighbor list based on a heading of the WGB and locations of the neighbor APs in the neighbor list, and then scans only the channels associated with APs in the immediate neighbor list.

In the immediate neighbor embodiment, over time, the WGB 50 determines a heading of the WGB relative to the neighbor APs on the neighbor list based on the AP locations on the neighbor list and WGB location information from, e.g., a GPS system. Determining a heading based on GPS information is well known.

The WGB 50 determines whether it is headed toward or away from each of the neighbor APs on the neighbor list based on the determined heading of the WGB and the AP locations in the neighbor list.

The WGB 50 populates the immediate neighbor list only with neighbor APs (and their associated channels) toward which the WGB is headed. Thus, the WGB 50 only actively scans the channels associated with the neighbor APs toward which the WGB is determined to be headed, and skips the channels associated with the neighbor APs away from which the WGB is determined to be headed.

At 420, if any probe responses are received from the active scans at 415 and RSSIs of the probe responses are all above the full scanning threshold, flow is directed to 425.

At 425, the WGB 50 determines a best neighbor AP on the neighbor list to which to roam (i.e., connect to next) based on results from the active scanning, e.g., RSSIs of received probe responses. The best neighbor AP is associated with (i) a greatest average RSSI among the neighbor APs, and (ii) positive RSSI differences.

At 430, the WGB 50 connects to the best neighbor AP (referred to simply as the "best AP" in FIG. 4 and the ensuing description).

At 435, the WGB 50 sends a request for a neighbor list to the best AP, and flow proceeds to 440.

At 440, if the WGB 50 receives a response, i.e., a neighbor list from the best AP, flow is directed to 445. At 445, the WGB 50 updates a local neighbor list database (i.e., the NeighborTable mentioned above) with the neighbor list from the best AP and updates neighbor counters for existing neighbors. Flow proceeds from 440 back to 405.

At 440, if the WGB 50 does not receive a response, flow is directed to 450. The term "CTLR" in block 440 refers to wireless network controller 30 or a controller of an AP (e.g., a controller of the current AP).

At 450, the WGB 50 determines whether the best AP was chosen based on a negative RSSI difference at 425. If the best AP was not chosen on the basis of a negative RSSI, flow proceeds to 455.

At 455, the WGB 50 resends the request sent previously at 435, and flow proceeds to 460.

At 460, if the WGB 50 receives a response to the resent request (i.e., the WGB receives a neighbor list in response to the retry), flow proceeds to 445.

Returning to 420, if no probe responses are received (i.e., heard) responsive to the active scans at 415, or if probe responses are received but their RSSIs are all below the full scanning threshold, flow proceeds to 470.

Returning to 450, if the best AP was chosen on the basis of a negative RSSI, flow proceeds to 470.

Returning to 460, if the WGB 50 does not receive a response to the resent request, flow proceeds to 470.

At 470, the WGB 50 deletes the previously received neighbor list from memory, and flow proceeds to 475 and 480.

At 475 and 480, the WGB 50 performs a FULL SCAN operation (also referred to as "full scanning" above) in search of a parent AP to which to the WGB can connect. The FULL SCAN includes (i) passive scans (i.e., listen-only scans) across a relatively large number of predetermined channels to listen for transmissions from neighbor APs, if any, followed by (ii) active scans only across those channels (among the predetermined channels) on which transmissions were received during the passive scan. The active scans include sending probe requests and receiving probe responses from APs. Flow proceeds from 480 to 425 to determine a next (best) AP to which to roam.

Figure 5:
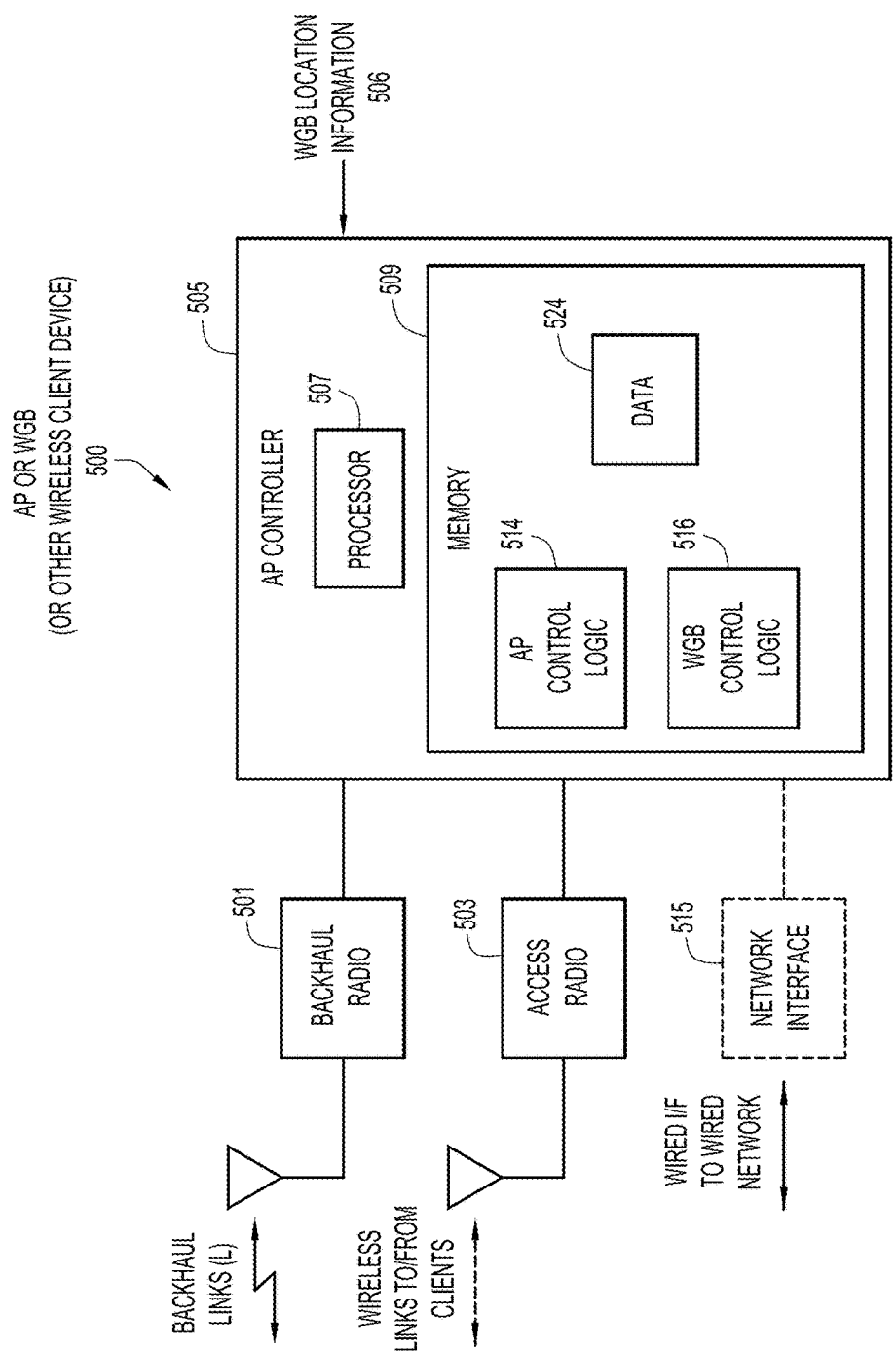
FIG. 5 is a block diagram of a wireless client or wireless workgroup bridge configured to operate according to the example embodiments presented herein.

With reference to FIG. 5, there is shown a block diagram of an example device 500 which represents either an AP (e.g., any of APs 20) or WGB 50 (or other wireless client device, e.g., wireless device 57). In other words, device 500 may be configured to perform techniques described herein related to AP 20 or WGB 50.

When configured as AP 20, device 500 includes a wireless backhaul radio 501 (also referred to a transmitter/receiver or "transceiver" 501) to support wireless backhaul links or channels for communication with other APs, a wireless access radio 503 to support access for wireless clients served by the AP (such as WGB 50) or other wireless clients, and a controller 505 (AP controller) to which the backhaul and access radios are coupled.

When configured as WGB 50, wireless backhaul radio 501 and access radio 503 may be used to connect with APs, and are coupled to controller 505 (WGB controller). Access radio 503 may also be used to connect with wireless clients of WGB 50, such as wireless client 57.

In an embodiment, radios 501 and 503 are integrated into a single radio. Backhaul radio 501 may operate according to IEEE 802.11a in the approximately 5 GHz band, and access radio 503 may operative according to IEEE 802.11b/g in the approximately 5.4 GHz band. Each radio includes a respective set of one or more antennas.

When configured as AP 20, device 500 may include a network interface 515 that enables the AP to connect to wireless network controller 30 over a wired connection.

When device 500 is configured as WGB 50, network interface 515 enables the WGB to connect to a wired device, such as switch 55.

When device 500 is configured as WGB 50, controller 505 also receives WGB location information 506 from any known source, such as a GPS. Location information 505 may include navigation solutions related to the WGB, such as location, heading, speed, and so on.

Controller 505 includes a processor 507 and memory 509. Processor 507 is a microcontroller or microprocessor, for example, configured to execute software instructions stored in memory 509. Memory 509 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 509 may comprise one or more computer readable storage media (e.g., a memory device) encoded with software comprising computer executable instructions and when the software is executed (by processor 507) it is operable to perform the operations described herein. For example, memory 509 stores or is encoded with instructions for:

a. If device 500 is configured as AP 20, AP Control logic 514 to perform overall control of the AP and implement AP operations related to creating and transmitting neighbor lists presented herein; and b. If device 500 is configured as WGB 50, WGB Control logic 516 to control the WGB and implement WGB operations related to using neighbor lists presented herein.

Memory 509 also stores information/data 524 used by logic 514 and/or 516, including, but not limited to, neighbor lists and NeighborTables, regulatory domain channel definitions, DFS channel definitions, Media Access Control (MAC) addresses, Internet Protocol (IP) addresses, and so on.

Figure 6:
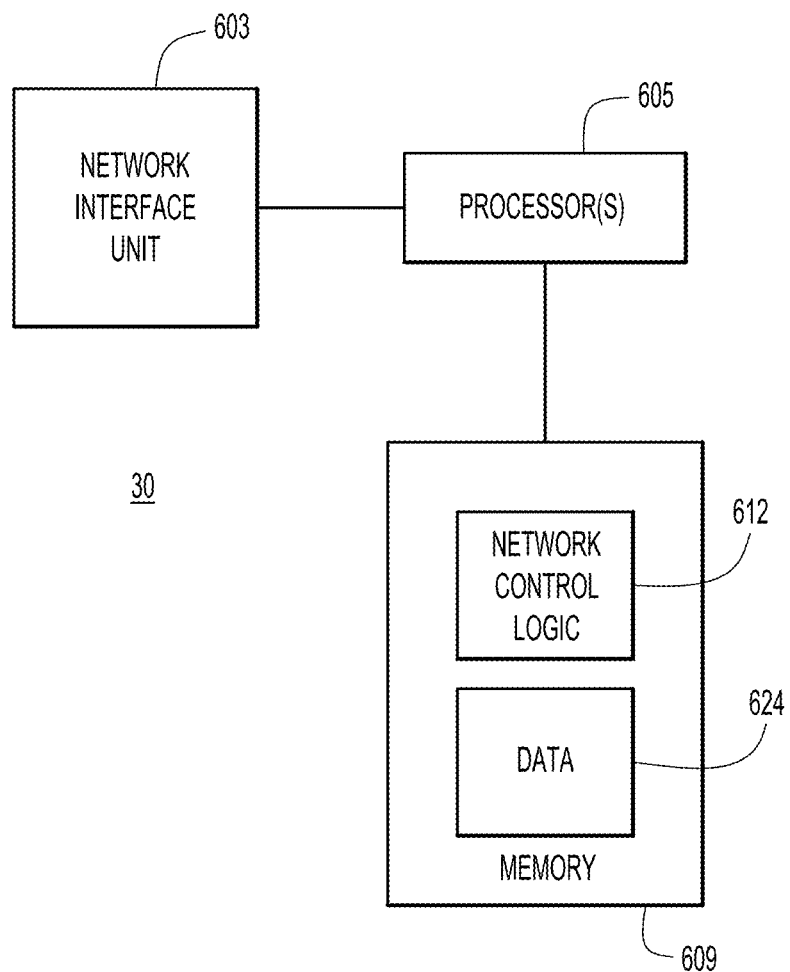
FIG. 6 is a block diagram of a wireless network controller configured to operate according to the example embodiments presented herein.

FIG. 6 shows an example block diagram of the wireless network controller 30 configured to perform the wireless network controller operations presented herein. The wireless network controller 30 includes a network interface unit 603 (e.g., an Ethernet card or multiple such cards) to provide connectivity with APs 20 (which may be wired or wireless), a processor or multiple processors 605 and a memory 609. The memory may be configured as memory 509 described above in connection with FIG. 5. The memory stores instructions for Network Control logic 612 that, when executed by the processor(s) 605, cause the processor(s) to perform the wireless network controller operations presented herein. Memory 609 also stores data 624 used and generated by logic 612, such as, but not limited to, neighbor list, AP locations, AP and WGB identifiers and addresses.

In summary, capabilities are included in the wireless network controller and a wireless client device (e.g., a WGB) to optimize the roaming algorithm for a high speed train (or other high speed vehicle) deployment scenario. A static/dynamic neighbor list is generated and used to improve scanning efficiency. An improved parent AP selection procedure, metrics, and thresholds are provided to optimize client roaming along the vehicle's path, e.g., the train track.

Advantageously, these techniques: are generic; work in both dynamic and static RF environment along various train tracks; take into account and any environmental and RF requirements; and work with any channel assignment algorithms, transmit power level, or antenna patterns of AP platforms. Moreover, these techniques dynamically detect if the current parent AP is becoming suboptimal, quickly identify potential new parent APs, initiate roaming, and maintain the quality of on-going traffic.

In summary, in one form, a method is provided comprising: at a wireless client device configured to connect with access points (APs) over wireless channels of the APs and route traffic between multiple devices served by the wireless client device and the connected APs: receiving a neighbor list from an access point (AP) to which the wireless client device is currently connected over a wireless channel, wherein the neighbor list identifies neighbor APs and wireless operating channels thereof in a vicinity of the AP; if a link quality of the wireless connection falls below a roam threshold, attempting to roam to a neighbor AP on the neighbor list, wherein the attempting to roam includes: actively scanning the wireless operating channels in the neighbor list; determining a best neighbor AP on the neighbor list to which to roam based on results of the active scanning; and if a best neighbor AP is determined, roaming to the best neighbor AP.

In summary, in another form, an apparatus is provided comprising: one or more radios to connect wirelessly with access points (APs) over wireless channels of the APs and multiple devices served by the apparatus; a processor, coupled to the one or more radios, and configured to route traffic between the multiple devices and the connected APs, the processor further configured to: receive a neighbor list from an access point (AP) to which the wireless client device is currently connected over a wireless channel, wherein the neighbor list identifies neighbor APs and wireless operating channels thereof in a vicinity of the AP; if a link quality of the wireless connection falls below a roam threshold, attempt to roam to a neighbor AP on the neighbor list, wherein the processor is further configured to: active scan the wireless operating channels in the neighbor list; determine a best neighbor AP on the neighbor list to which to roam based on results of the active scan; and if a best neighbor AP is determined, roam to the best neighbor AP.

In summary, in yet another a method is provided comprising: at an access point (AP) in a network of APs each configured to connect with a wireless client device over wireless channels, the wireless client device configured to serve client devices and route traffic between the client devices and the network over the wireless channels; scanning wireless channels for receipt of neighbor discovery packets broadcasted by neighbor APs in a vicinity of the AP; populating a neighbor list with identities of neighbor APs and corresponding scanned channels served thereby from which the neighbor discovery packets were received; broadcasting neighbor discovery packets for receipt by the neighbor APs; wirelessly connecting to the wireless client device; receiving a request for the neighbor list from the wireless client device; and in response to the received request, transmitting the neighbor list to the wireless client device.

The above description is intended by way of example only.

What is claimed is:

1. A method comprising:
at a wireless client device configured to connect with access points (APs) over wireless channels of the APs and route traffic between multiple devices served by the wireless client device and the connected APs:
receiving a neighbor list from an access point (AP) to which the wireless client device is currently connected over a wireless channel, wherein the neighbor list identifies neighbor APs and wireless operating channels thereof, including Dynamic Frequency Selection (DFS) channels that have been determined to be clear of interfering radar events, in a vicinity of the AP;
if a link quality of the wireless connection falls below a roam threshold, attempting to roam to a neighbor AP on the neighbor list, wherein the attempting to roam includes:
actively scanning the wireless operating channels in the neighbor list, including actively scanning the DFS channels without passively scanning the DFS channels;
determining a best neighbor AP on the neighbor list to which to roam based on results of the active scanning; and
if a best neighbor AP is determined, roaming to the best neighbor AP; and
if the attempting to roam to a best neighbor AP on the neighbor list has failed, deleting the received neighbor list and roaming to an AP based on a full scanning procedure that includes passive and active scanning of wireless channels identified in a preconfigured list of wireless channels and associated APs;
sending a request for a neighbor list to the best neighbor AP to which the wireless client device has roamed;
if a neighbor list is not received responsive to the request, resending the request;
if a neighbor list is received responsive to the resent request, storing the received neighbor list for subsequent attempts to roam;
if a neighbor list is not received responsive to the resent request, deleting all previous neighbor lists; and
for subsequent roaming in an absence of the neighbor lists, performing full scanning of the preconfigured list of wireless channels and associated APs, including passive scanning followed by active scanning of the wireless channels on the preconfigured list.

2. The method of claim 1, wherein:
the actively scanning includes broadcasting probe requests and receiving probe responses on the channels; and
the determining a best neighbor AP on the neighbor list includes, for each neighbor AP on the neighbor list from which probe responses are received:
determining a Received Signal Strength Indication (RSSI) for each received probe response;
determining an average RSSI based on the RSSIs;
determining an RSSI difference between consecutive RSSIs, including a most recently received RSSI and a last but one most recently received RSSI; and
determining the best neighbor AP, if any, as the neighbor AP associated with (i) a greatest one of the average RSSIs, and (ii) a positive RSSI difference.

3. The method of claim 1, further comprising, at the wireless client device: declaring that the attempting to roam to a best neighbor has failed if the actively scanning has failed to solicit any probe responses from the neighbor APs on the list or if all probe responses received from the neighbor APs have Received Signal Strength Indications (RSSIs) that are less than a predetermined full scanning threshold RSSI that is less than a roam threshold RSSI.

4. The method of claim 1, further comprising, at the wireless client device:
if a neighbor list is received from the best neighbor AP responsive to the request, storing the received neighbor list for subsequent attempts to roam.

5. The method of claim 1, further comprising, at the wireless client device:
repetitively determining the link quality of the wireless connection at a repetition rate;
determining a speed of the wireless client device; and
increasing and decreasing the repetition rate in correspondence with increasing and decreasing determined wireless client device speed, respectively.

6. The method of claim 5, further comprising, at the wireless client device:
the determining the link quality includes determining an average Received Signal Strength Indication (RSSI) for the wireless connection based on a number N of packets received from the current AP over the wireless connection; and
increasing and decreasing the number N of received packets used to determine the average RSSI in correspondence with increasing and decreasing determined wireless client device speed, respectively.

7. The method of claim 1, wherein the neighbor list includes an AP location for each neighbor AP on the neighbor list, and the method further comprises, at the wireless client device:
determining a heading of the wireless client device relative to the neighbor APs on the neighbor list based on the AP locations on the neighbor list; and
determining whether the wireless client device is headed toward or away from each of the neighbor APs on the neighbor list based on the determined heading and the AP locations in the neighbor list,
wherein the actively scanning includes:
actively scanning the channels on the neighbor list that are associated with the neighbor APs toward which the wireless client device is determined to be headed; and
skipping the channels on the neighbor list associated with the neighbor APs away from which the wireless client device is determined to be headed.

8. The method of claim 1, wherein the wireless client device is a Workgroup Bridge.

9. The method of claim 1, wherein the wireless client device includes first and second radios through which the wireless client device is able to communicate with the APs, wherein the attempting to roam further comprises:
using the second radio for passively scanning and actively scanning in 2.5/5.8 GHz frequency bands for neighbor APs;
receiving beacons and probe responses in the 2.4/5.8 GHz frequency band that include Dynamic Frequency Selection (DFS) channel status for a 5 GHz frequency band; and
actively scanning on DFS channels in the 5 GHz frequency band that are indicated in the beacon and probe responses as being free of radar signals.

10. An apparatus comprising:
one or more radios to connect wirelessly with access points (APs) over wireless channels of the APs and multiple devices served by the apparatus;
a processor, coupled to the one or more radios, and configured to route traffic between the multiple devices and the connected APs, the processor further configured to:
receive a neighbor list from an access point (AP) to which the wireless client device is currently connected over a wireless channel, wherein the neighbor list identifies neighbor APs and wireless operating channels thereof, including Dynamic Frequency Selection (DFS) channels that have been determined to be clear of interfering radar events, in a vicinity of the AP;
if a link quality of the wireless connection falls below a roam threshold, attempt to roam to a neighbor AP on the neighbor list, wherein the processor is further configured to:
active scan the wireless operating channels in the neighbor list, wherein the active scan includes an active scan of the DFS channels without performing a passive scan of the DFS channels;
determine a best neighbor AP on the neighbor list to which to roam based on results of the active scan; and
if a best neighbor AP is determined, roam to the best neighbor AP; and
if the attempt to roam to a best neighbor AP on the neighbor list has failed, delete the received neighbor list and roam to an AP based on a full scanning procedure that includes passive and active scanning of wireless channels identified in a preconfigured list of wireless channels and associated APs;
send a request for a neighbor list to the best neighbor AP to which the wireless client device has roamed;
if a neighbor list is not received responsive to the request, resend the request;
if a neighbor list is received responsive to the resent request, store the received neighbor list for subsequent attempts to roam;
if a neighbor list is not received responsive to the resent request, delete all previous neighbor lists; and
for subsequent roaming in an absence of the neighbor lists, perform full scanning of the preconfigured list of wireless channels and associated APs, including passive scanning followed by active scanning of the wireless channels on the preconfigured list.

11. The apparatus of claim 10, wherein the processor is configured to:
active scan by broadcasting probe requests and receiving probe responses on the channels; and
determine a best neighbor AP on the neighbor list by, for each neighbor AP on the neighbor list from which probe responses are received:
determining a Received Signal Strength Indication (RSSI) for each received probe response;
determining an average RSSI based on the RSSIs;
determining an RSSI difference between consecutive RSSIs, including a most recently received RSSI and a last but one most recently received RSSI; and
determining the best neighbor AP, if any, as the neighbor AP associated with (i) a greatest one of the average RSSIs, and (ii) a positive RSSI difference.

12. The apparatus of claim 10, wherein the processor is further configured to:
if a neighbor list is received from the best neighbor AP responsive to the request, store the received neighbor list for subsequent attempts to roam.

13. The apparatus of claim 10, wherein the processor is further configured to:
repetitively determine the link quality of the wireless connection at a repetition rate;
determine a speed of the wireless client device; and
increase and decrease the repetition rate in correspondence with an increase and a decrease of determined wireless client device speed, respectively.

14. The apparatus of claim 13, wherein the processor is further configured to:
determine the link quality by determining an average Received Signal Strength Indication (RSSI) for the wireless connection based on a number N of packets received from the current AP over the wireless connection; and
increase and decrease the number N of received packets used to determine the average RSSI in correspondence with an increase and a decrease of determined wireless client device speed, respectively.

15. The apparatus of claim 10, wherein the neighbor list includes an AP location for each neighbor AP on the neighbor list, and the processor is further configured to:
over time, determine a heading of the wireless client device relative to the neighbor APs on the neighbor list based on the AP locations on the neighbor list; and
determine whether the wireless client device is headed toward or away from each of the neighbor APs on the neighbor list based on the determined heading and the AP locations in the neighbor list,
wherein the processor is configured to active scan by:
actively scanning the channels on the neighbor list that are associated with the neighbor APs toward which the wireless client device is determined to be headed; and
skipping the channels on the neighbor list associated with the neighbor APs away from which the wireless client device is determined to be headed.

16. A non-transitory computer readable medium encoded with instruction that, when executed by a processor of a wireless client device configured to connect with access points (APs) over wireless channels of the APs and route traffic between multiple devices served by the wireless client device and the connected APs, cause the processor to perform:
receiving a neighbor list from an access point (AP) to which the wireless client device is currently connected over a wireless channel, wherein the neighbor list identifies neighbor APs and wireless operating channels thereof, including Dynamic Frequency Selection (DFS) channels that have been determined to be clear of interfering radar events, in a vicinity of the AP;
if a link quality of the wireless connection falls below a roam threshold, attempting to roam to a neighbor AP on the neighbor list, wherein the attempting to roam includes:
actively scanning the wireless operating channels in the neighbor list, including actively scanning the DFS channels without passively scanning the DFS channels;
determining a best neighbor AP on the neighbor list to which to roam based on results of the active scanning; and
if a best neighbor AP is determined, roaming to the best neighbor AP; and if the attempting to roam to a best neighbor AP on the neighbor list has failed, deleting the received neighbor list and roaming to an AP based on a full scanning procedure that includes passive and active scanning of wireless channels identified in a preconfigured list of wireless channels and associated APs;

sending a request for a neighbor list to the best neighbor AP to which the wireless client device has roamed;

if a neighbor list is not received responsive to the request, resending the request;

if a neighbor list is received responsive to the resent request, storing the received neighbor list for subsequent attempts to roam;

if a neighbor list is not received responsive to the resent request, deleting all previous neighbor lists; and for subsequent roaming in an absence of the neighbor lists, performing full scanning of the preconfigured list of wireless channels and associated APs, including passive scanning followed by active scanning of the wireless channels on the preconfigured list.

17. The non-transitory computer readable medium of claim 16, wherein:

the instructions to cause the processor to perform the actively scanning include instructions to cause the processor to perform broadcasting probe requests and receiving probe responses on the channels; and the instructions to cause the processor to perform the determining a best neighbor AP on the neighbor list include instructions to cause the processor to perform, for each neighbor AP on the neighbor list from which probe responses are received:

determining a Received Signal Strength Indication (RSSI) for each received probe response;

determining an average RSSI based on the RSSIs;

determining an RSSI difference between consecutive RSSIs, including a most recently received RSSI and a last but one most recently received RSSI; and determining the best neighbor AP, if any, as the neighbor AP associated with (i) a greatest one of the average RSSIs, and (ii) a positive RSSI difference.

18. The non-transitory computer readable medium of claim 16, further comprising instructions to cause the processor to perform: declaring that the attempting to roam to a best neighbor has failed if the actively scanning has failed to solicit any probe responses from the neighbor APs on the list or if all probe responses received from the neighbor APs have Received Signal Strength Indications (RSSIs) that are less than a predetermined full scanning threshold RSSI that is less than a roam threshold RSSI.

19. The non-transitory computer readable medium of claim 16, further comprising instruction to cause the processor to perform:

if a neighbor list is received from the best neighbor AP responsive to the request, storing the received neighbor list for subsequent attempts to roam.

20. The non-transitory computer readable medium of claim 16, further comprising instructions to cause the processor to perform:

repetitively determining the link quality of the wireless connection at a repetition rate;

determining a speed of the wireless client device; and increasing and decreasing the repetition rate in correspondence with increasing and decreasing determined wireless client device speed, respectively.

21. The non-transitory computer readable medium of claim 20, wherein:

the instructions to cause the processor to perform the determining the link quality include instructions to cause the processor to perform determining an average Received Signal Strength Indication (RSSI) for the wireless connection based on a number N of packets received from the current AP over the wireless connection; and the instructions further include instructions to cause the processor to perform increasing and decreasing the number N of received packets used to determine the average RSSI in correspondence with increasing and decreasing determined wireless client device speed, respectively.

22. The non-transitory computer readable medium of claim 16, wherein the neighbor list includes an AP location for each neighbor AP on the neighbor list, and the non-transitory computer readable medium further comprises instructions to cause the processor to perform:

determining a heading of the wireless client device relative to the neighbor APs on the neighbor list based on the AP locations on the neighbor list; and determining whether the wireless client device is headed toward or away from each of the neighbor APs on the neighbor list based on the determined heading and the AP locations in the neighbor list, wherein the instructions to cause the processor to perform the actively scanning include instructions to cause the processor to perform:

actively scanning the channels on the neighbor list that are associated with the neighbor APs toward which the wireless client device is determined to be headed; and skipping the channels on the neighbor list associated with the neighbor APs away from which the wireless client device is determined to be headed.

* * * * *